UNITED STATES PATENT OFFICE.

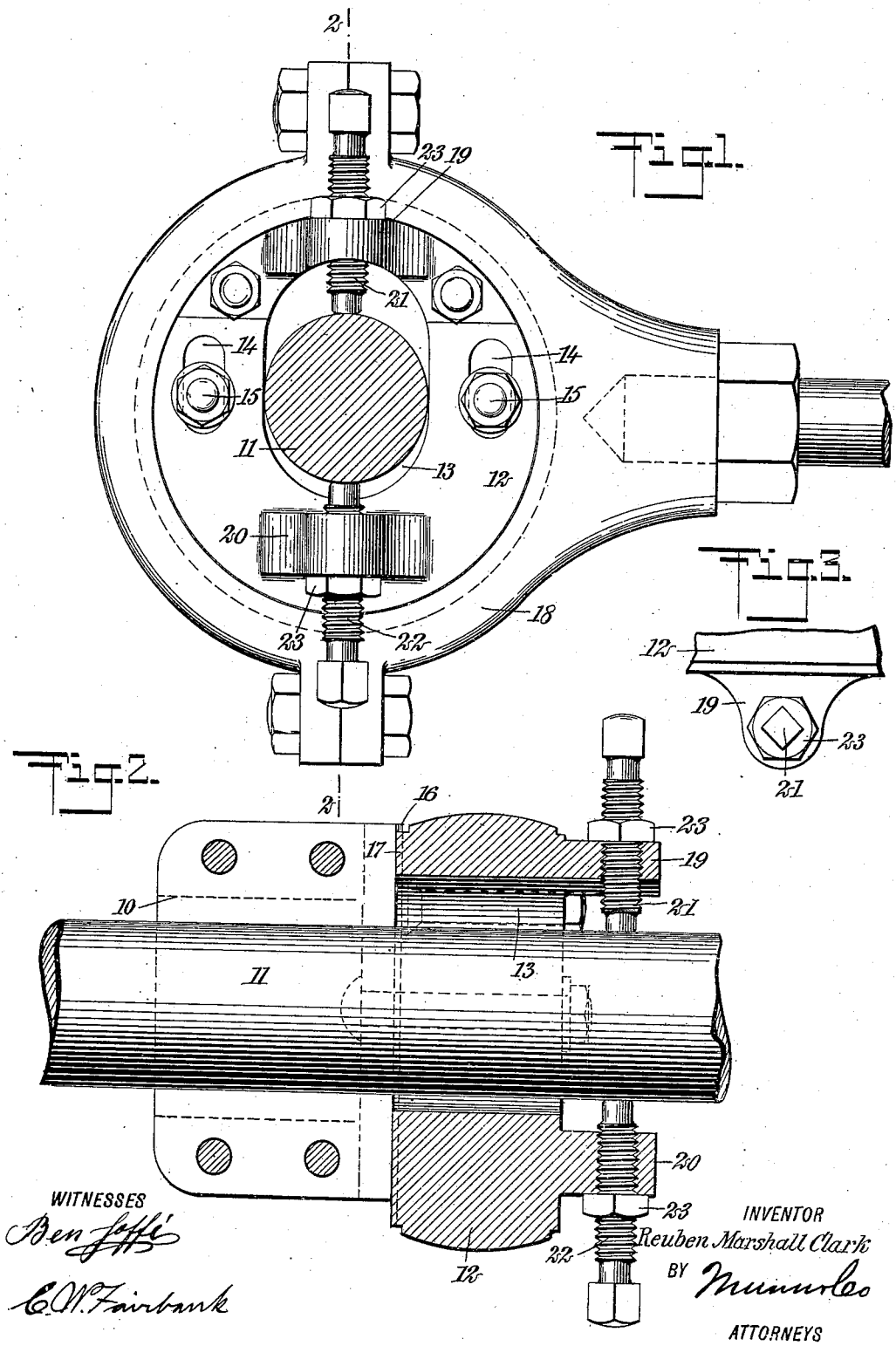

REUBEN MARSHALL CLARK, OF WEBB CITY, MISSOURI.

ECCENTRIC.

980,760.     Specification of Letters Patent.     Patented Jan. 3, 1911.

Application filed March 20, 1909. Serial No. 484,691.

*To all whom it may concern:*

Be it known that I, REUBEN MARSHALL CLARK, a citizen of the United States, and a resident of Webb City, in the county of Jasper and State of Missouri, have invented a new and Improved Eccentric, of which the following is a full, clear, and exact description.

This invention relates to certain improvements in eccentrics, and more particularly to that type of eccentric which provides for the adjustment of the eccentric in respect to the shaft so as to vary the eccentricity.

More particularly, my invention relates to that type of eccentric shown in my prior Patent No. 855,282, granted May 28th, 1907, and my prior application Serial No. 463,201, filed November 18th, 1908.

In the constructions illustrated in both of my prior cases above referred to, I employ a collar clamped rigidly in respect to the shaft, and provide an eccentric disk so connected to the collar that it may be adjusted radially in respect to the shaft. My present invention involves the provision of additional means for more firmly locking the eccentric disk in position after adjustment, whereby the liability of the disk becoming loosened is materially reduced.

Reference is to be had to the accompanying drawings forming a part of this specification, in which similar characters of reference indicate corresponding parts in all the views.

Figure 1 is a side view of a device constructed in accordance with my invention; Fig. 2 is a transverse section on the line 2—2 of Fig. 1; and Fig. 3 is a detail, showing one of the retaining lugs.

In all essential particulars, the eccentric illustrated in the accompanying drawings is substantially the same as that illustrated in my prior application above referred to, except for the additional locking means.

The device includes a collar 10, formed of two separate sections or halves bolted together, so as to clamp said collar rigidly in respect to the shaft 11. The eccentric disk 12 is provided with an elongated opening or slot 13 extending along a diameter thereof, and through which extends the shaft 11. At opposite sides of this opening 13 are two slots 14, 14, through which extend bolts 15 for locking the disk to the collar. By loosening these bolts the disk may be moved along a diameter thereof so as to bring it concentric with the shaft, or eccentric in respect thereto. The collar is preferably provided with a slot 16 in the face thereof toward the disk, and within this slot moves a flange 17 on the disk. The slot and flange connections between the collar and disk serve to guide the disk during its adjustment and to resist any tendency of the disk to rotate in respect to the collar.

Encircling the disk is an eccentric strap 18, preferably formed of two sections bolted together, and so formed as to be held against any movement lengthwise of the shaft and in respect to the disk. The parts so far described constitute no portion of my present invention. As the disk is supported at only one end thereof by means of the collar, practically all of the strain comes on the two bolts 15 which hold the two together, and a slight loosening of these bolts permits the disk to shift its position in respect to the shaft. This necessitates a re-adjustment of the disk, which is accompanied by considerable difficulty, particularly on locomotives, where the eccentric operates a very heavy plunger. To more effectively lock the disk in position, and prevent it from shifting its position after it has once been adjusted, I provide two outwardly extending lugs 19 and 20 on the face of the disk opposite to the collar. These lugs may be formed integral with the body of the disk, and in case the disk is formed of two separate sections, each lug may be carried by a different section. These lugs are positioned adjacent opposite ends of the elongated opening 13 and each is provided with a threaded aperture therethrough radially disposed in respect to the shaft. Through these threaded openings extend two set screws 21 and 22, in alinement with each other and adapted to engage with diametrically opposite points on the shaft. These set screws may be locked in position by lock nuts 23, if desired.

After the disk has been adjusted to the proper position in respect to the collar, and has been firmly bolted thereto by the tightening of the bolts 15, I then tighten the set screws 21 and 22 until their inner ends firmly engage with the shaft. As these bolts are in alinement, they hold the shaft between them, and as they are adjacent the ends of the elongated opening 13, they positively prevent any movement of the shaft lengthwise of this opening. They are spaced outwardly beyond the limits of the eccentric strap 18, so that they do not interfere with the latter and they are disposed upon the opposite sides of the disk from the collar, so that the disk is firmly supported on both sides.

It is, of course, understood that as my present invention relates solely to the locking means, other forms of collars, disks and eccentric straps could be used in place of those shown, without departing from the spirit of my invention.

Having thus described my invention, I claim as new and desire to secure by Letters Patent:

In combination, a shaft, a collar rigidly secured thereto, an eccentric disk mounted on said shaft at one end of the collar and having an opening therethrough elongated along the diameter of the disk and through which opening said shaft extends, and slots at opposite sides of the elongated opening, bolts extending through the slots of the disk into the end of the collar, substantially parallel to said shaft, for rigidly securing the disk to the collar and permitting of the adjustment of the disk in respect to the collar and shaft to vary its eccentricity, outwardly-extending lugs carried by said disk upon the face thereof remote from said collar and adjacent the ends of said elongated opening, and radially-disposed set screws extending through said lugs and engaging directly with opposite sides of the shaft to lock the disk against movement with respect to the shaft and also to additionally hold the disk and collar from movement lengthwise of the shaft.

In testimony whereof I have signed my name to this specification in the presence of two subscribing witnesses.

REUBEN MARSHALL CLARK.

Witnesses:
S. A. LOGSDON,
A. L. EPLEY.